US009167152B2

(12) United States Patent
Inoue et al.

(10) Patent No.: US 9,167,152 B2
(45) Date of Patent: Oct. 20, 2015

(54) IMAGE CAPTURING APPARATUS AND METHOD FOR CALCULATING FOCUSING PARAMETER VALUE

(71) Applicant: FUJIFILM Corporation, Tokyo (JP)

(72) Inventors: Kazuki Inoue, Saitama (JP); Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 26 days.

(21) Appl. No.: 14/228,989

(22) Filed: Mar. 28, 2014

(65) Prior Publication Data

US 2014/0211075 A1 Jul. 31, 2014

Related U.S. Application Data

(63) Continuation of application No. PCT/JP2012/072481, filed on Sep. 4, 2012.

(30) Foreign Application Priority Data

Sep. 30, 2011 (JP) .................................. 2011-218532
Aug. 30, 2012 (JP) .................................. 2012-189504

(51) Int. Cl.
*H04N 5/232* (2006.01)
*H04N 5/369* (2011.01)
*G02B 7/28* (2006.01)
*G02B 7/34* (2006.01)

(52) U.S. Cl.
CPC .............. *H04N 5/23212* (2013.01); *G02B 7/28* (2013.01); *G02B 7/34* (2013.01); *H04N 5/3696* (2013.01)

(58) Field of Classification Search
CPC ... H04N 5/23212; H04N 5/3696; G02B 7/28; G02B 7/34
USPC ............. 348/208.12, 231.3, 231.6, 241, 335, 348/345, 346, 347, 348, 349, 350, 351, 352, 348/353, 354, 355, 356, 357, 359, 360, 361, 348/373, 374
See application file for complete search history.

(56) References Cited

U.S. PATENT DOCUMENTS 8,218,962 B2 * 7/2012 Fujii et al. ..................... 396/100
2002/0121652 A1 9/2002 Yamasaki
(Continued)

FOREIGN PATENT DOCUMENTS

JP 2008-83456 A 4/2008
JP 2008-275712 A 11/2008
(Continued)

OTHER PUBLICATIONS

Extended European Search Report, issued Apr. 7, 2015, for European Application No. 12836515.2.
(Continued)

*Primary Examiner* — Twyler Haskins
*Assistant Examiner* — Peter Chon
(74) *Attorney, Agent, or Firm* — Birch, Stewart, Kolasch & Birch, LLP

(57) ABSTRACT

An image capturing apparatus includes: an image capturing element in which a plurality of pixels and phase difference pixels are formed within an effective pixel region; a photographing lens; a phase difference amount detecting unit analyzing a captured image signal and obtaining a phase difference amount from detection signals of two of the phase difference pixels that make a pair; and a control unit obtaining a defocus amount of a photographic subject image from the detected phase difference amount and performing a focusing control, in which the control unit obtains a parameter value regarding a ratio of the defocus amount and the phase difference amount based on photographing lens information of the photographing lens and a light receiving sensitivity distribution indicating sensitivity for each incident angle of incident light for the two of the phase difference pixels that make the pair, and obtains the defocus amount.

10 Claims, 13 Drawing Sheets

(56) References Cited

U.S. PATENT DOCUMENTS

| | | |
|---|---|---|
| 2011/0007176 A1 | 1/2011 | Hamano |
| 2011/0109775 A1* | 5/2011 | Amano ............... 348/241 |
| 2011/0164169 A1 | 7/2011 | Yamasaki |
| 2011/0199506 A1 | 8/2011 | Takamiya |
| 2011/0228145 A1* | 9/2011 | Kimura ............... 348/247 |
| 2012/0176520 A1* | 7/2012 | Hara ................... 348/246 |

FOREIGN PATENT DOCUMENTS

| | | |
|---|---|---|
| JP | 2009-75407 A | 4/2009 |
| JP | 2009-77143 A | 4/2009 |
| JP | 2010-107771 A | 5/2010 |
| JP | 2010-140013 A | 6/2010 |
| JP | 2011-2848 A | 1/2011 |
| JP | 2011-176714 A | 9/2011 |
| JP | 2011176714 A * | 9/2011 |

OTHER PUBLICATIONS

International Search Report, issued in PCT/JP2012/072461, dated Dec. 18, 2012.

* cited by examiner

IMAGE CAPTURING APPARATUS AND METHOD FOR CALCULATING FOCUSING PARAMETER VALUE

CROSS REFERENCE TO RELATED APPLICATIONS

This is a continuation of International Application No. PCT/JP2012/072481 filed on Sep. 4, 2012, and claims priority from Japanese Patent Application Nos. 2011-218532, filed on Sep. 30, 2011, and 2012-189504, filed on Aug. 30, 2012, the entire disclosures of which are incorporated herein by reference.

TECHNICAL FIELD

The present invention relates to an image capturing apparatus including an image capturing element with a phase difference pixel and a method for calculating a focusing parameter value.

BACKGROUND ART

Some pixels of a plurality of pixels formed and arranged in a light receiving region in a two-dimensional array pattern are formed by a phase difference pixel (also referred to as a focus detecting pixel) in an image sensor installed in an image capturing apparatus (camera). In the image capturing apparatus installed with the image capturing element, a phase difference AF method is adopted as an AF method that adjusts a focus position of a photographing lens to a photographic subject.

The phase difference pixel has a structure in which the phase difference pixel is pupil-divided into one pixel and the other pixel of a pair of pixels, and one pixel receives one beam of two beams through different light paths of the photographing lens and the other pixel receives the other beam to detect a relative positional deviation of a pupil dividing direction. In addition, a method of controlling an out-of-focus amount of the photographing lens depending on the positional deviation amount is the phase difference AF method.

Meanwhile, the image capturing apparatus installed with the image capturing element includes a lens replacement type image capturing apparatus in addition to an image capturing apparatus to which one type of photographing lens is fixed and used. When the photographing lens is replaced, an opening F number or a focus distance, a spherical aberration, and the like of the photographing lens are changed.

In the image capturing apparatus installed with the image capturing element including the phase difference pixel, when the image capturing apparatus is the lens replacement type image capturing apparatus, since a physical condition such as a placement position of the phase difference pixel on the image capturing apparatus or an interval between the pair of pixels cannot be changed, when the photographing lens is replaced, a focusing precision of the photographing lens is influenced.

Therefore, in the related art, for example, as disclosed in Patent Literature 1 below, a compensation amount is prepared as table data and when the photographing lens is replaced, appropriate table data is selected.

CITATION LIST

Patent Literature

Patent Literature 1: JP-2010-107771

SUMMARY OF INVENTION

Technical Problem

When an appropriate compensation amount is calculated from table data whenever a photographing lens is replaced, phase difference AF processing having a high precision may be executed However, when table data for compensation is prepared for each of various types of photographing lenses, a large capacity of memory is required, thereby increasing manufacturing cost of an image capturing apparatus. Further, when the photographing lens is replaced with a photographing lens of a type in which the table data is not prepared, an appropriate phase difference AF control cannot be executed, and as a result, an out-of-focus image is photographed.

An object of the present invention is to provide an image capturing apparatus that can be solved by a small capacity of memory and execute an excellent phase difference AF control regardless of the type of photographing lens replaced, and a method for calculating a focusing parameter value.

Solution to Problem

An image capturing apparatus and a method for calculating a focusing parameter value of the present invention is characterized by comprising: an image capturing element in which a plurality of pixels is foamed and arranged in a two-dimensional array pattern and phase difference pixels are formed in a focus detection region within an effective pixel region; a photographing lens installed in a stage preceding the image capturing element; a phase difference amount detecting unit analyzing a captured image signal by the image capturing element and obtaining a phase difference amount from detection signals of two of the phase difference pixels that make a pair; and a control unit obtaining a defocus amount of a photographic subject image picked up by the image capturing element through the photographing lens from the phase difference amount detected by the phase difference amount detecting unit and performing a focusing control of the photographing lens, in which the control unit obtains a parameter value regarding a ratio of the defocus amount and the phase difference amount based on photographing lens information of the photographing lens and a light receiving sensitivity distribution which indicates sensitivity for each incident angle of incident light for the two of the phase difference pixels that make the pair, and obtains the defocus amount from the parameter value and the detected phase difference amount.

Advantageous Effects of Invention

According to the present invention, although a photographing lens is replaced, and as a result, even though an F number is changed, a focusing parameter value to perform a focusing control having a high precision can be acquired.

DESCRIPTION OF EMBODIMENTS

Hereinafter, an embodiment of the present invention will be described with reference to the accompanying drawings.

Figure 1:
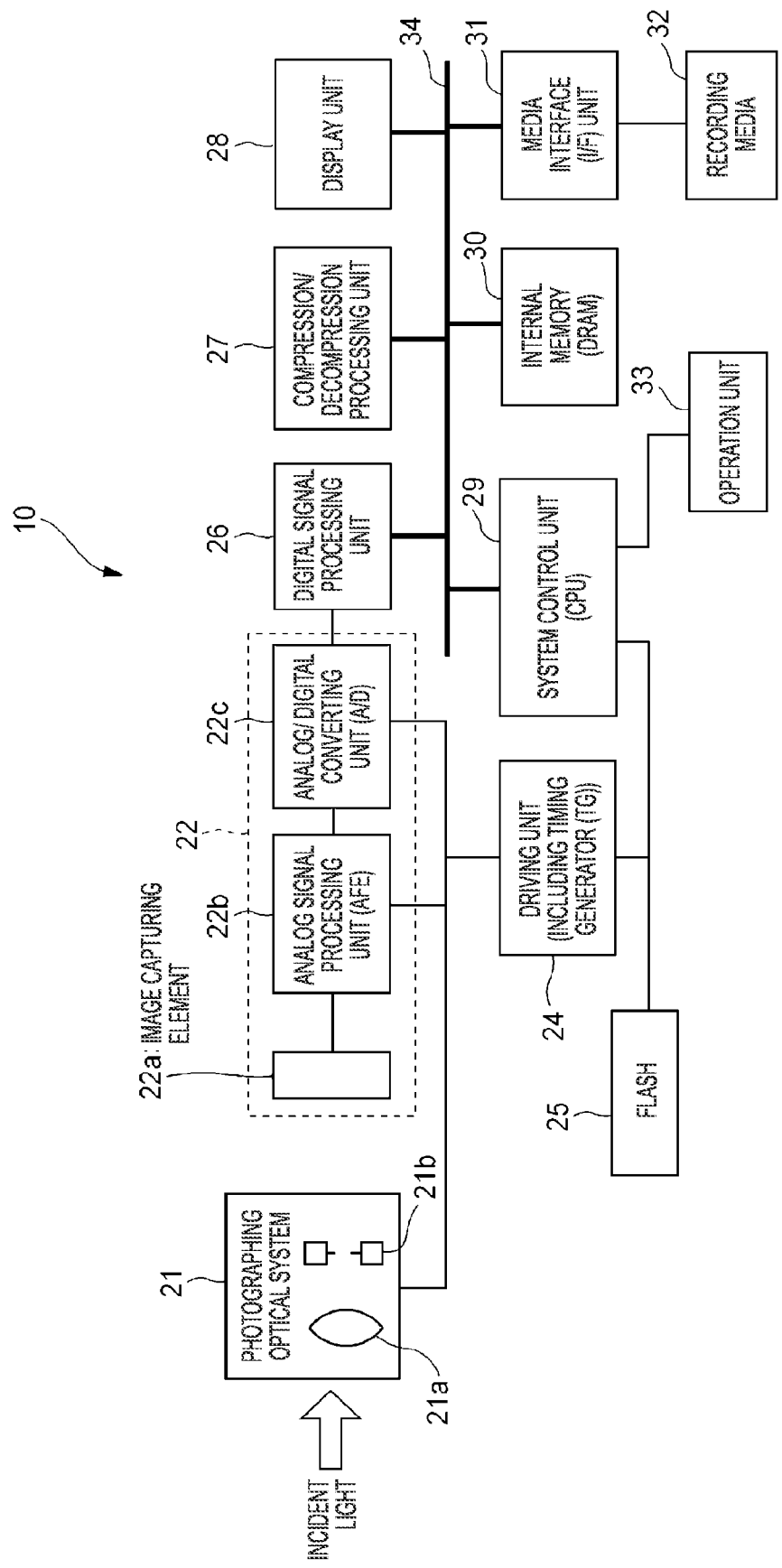
FIG. 1 is a functional block diagram of an image capturing apparatus according to an embodiment of the present invention.

FIG. 1 is a functional block configuration diagram of a digital camera (image capturing apparatus) according to an embodiment of the present invention. The digital camera 10 includes a photographing optical system 21 including a photographing lens 21a or a diaphragm 21b and an image capturing element chip 22 disposed on a rear end of the photographing optical system 21. The photographing optical system 21 is replaceably installed and a user may select a desired photographing optical system (a wide-angle lens system, a telephoto lens system, and the like).

The image capturing element chip 22 includes a single-plate type solid-state image capturing element 22a for capturing a color image such as a CCD type or a CMOS type as signal reading means, an analog signal processing unit (AFE) 22b performing analog processing such as automatic gain control (AGC) or correlation dual sampling on analog image data output from the solid-state image capturing element 22a, and an analog/digital converting unit (A/D) 22c converting the analog image data output from the analog signal processing unit 22b into digital image data.

The digital camera 10 further includes a driving unit (including a timing generator (TG)) 23 performing a focus position control or a zoom position control of the photographing optical system 21 or controlling driving of the solid-state image capturing element 22a, the analog signal processing unit 22b, and the A/D 22c by an instruction from a system control unit (CPU) 29 to be described below and a flash 25 emitting light by the instruction from the CPU 29. The driving unit 23 may be mounted in the image capturing element chip 22 together.

The digital camera 10 of the embodiment further includes a digital signal processing unit 26 performing known image processing such as acquisition or interpolation processing, white balance correction, RGB/YC conversion processing, and the like on the digital image data output from the A/D 22c, a compression/decompression processing unit 27 compressing image data into image data such as a JPEG format, while decompressing the image data, a display unit 28 displaying a menu, and the like or a through image (live view image) or a captured image, the system control unit (CPU) 29 integrally controlling the entire digital camera, an internal memory 30 such as a frame memory, or the like, a media interface (I/F) unit 31 performing interface-processing with a recording media 32 storing JPEG image data, and the like, and a bus 34 connecting them to each other, and an operating unit 33 for inputting an instruction from a user is connected to the system control unit 29.

The system control unit 29 serves as a phase difference amount detecting unit and a control unit that performs the focus position control (focusing control) of the photographing optical system 21by acquiring the phase difference amount from the detection signal of the phase difference pixel or calculating a focusing parameter value to be described below, by using the digital signal processing unit 26 thereunder.

Figure 2:
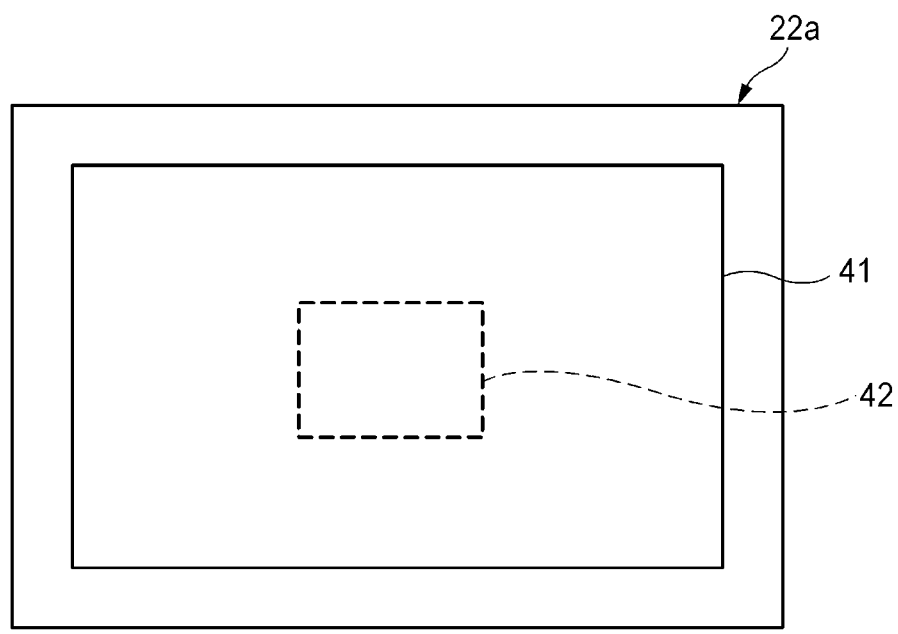
FIG. 2 is an explanatory diagram of a solid-state image capturing element illustrated in FIG. 1.

FIG. 2 is a surface schematic diagram of the solid-state image capturing element 22a. The solid-state image capturing element 22a is formed on a rectangular semiconductor substrate which is long in width and a plurality of pixels (a photoelectric conversion element: a photodiode) is formed in a light receiving region (effective pixel region) 41 in a two-dimensional array pattern. A center region of the light receiving region 41 is configured as a focus detection region 42 and a phase difference pixel to be described below is provided in the focus detection region 42.

Figure 3:
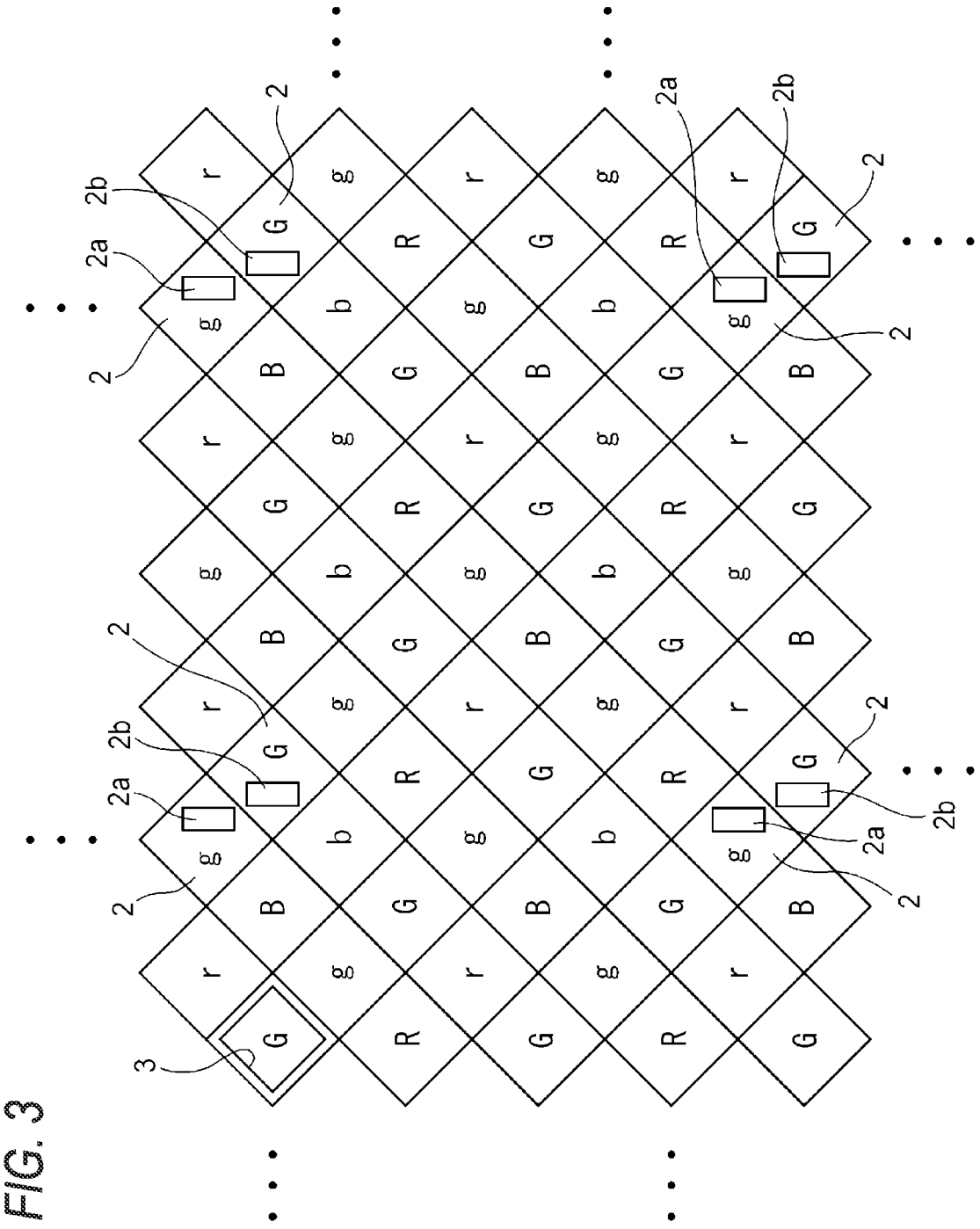
FIG. 3 is a partial enlarged diagram of a focus detection region of the solid-state image capturing element illustrated in FIG. 2.

FIG. 3 is an enlarged diagram of a partial region of the focus detection region 42 illustrated in FIG. 2 and illustrates a pixel array and a color filter array. In the illustrated embodiment, a so-called honeycomb pixel array is provided, in which an odd-numbered (alternatively, even-numbered) pixel row (a square frame which is tilted at 45° represents each pixel and R (red), G (green), and B (blue) on each pixel represent colors of color filters) is disposed to be shifted from an even-numbered (or odd-numbered) pixel row by ½ pixel pitch.

In addition, in the case of each pixel of the even row, the pixel array becomes a square lattice array and three primary color filters RGB are bayer-arrayed thereon. In addition, in the case of each pixel of the odd row, the pixel array becomes the square lattice array and three primary color filters rgb are bayer-arrayed thereon. R=r, G=g, and B=b, and same-color pixels that are slantly adjacent to form pair pixels. Light receiving areas of the respective pixels are the same as each other and the sizes of light blocking layer openings are also the same as each other (the sizes of the light blocking layer openings of only phase difference pixels to be described below are different from each other). Further, microlenses having the same shape mounted in all pixels are on the respective color filters (they are not illustrated).

In a pixel row of pixels (hereinafter, referred to as a G pixel, R, B, r, g, and b are also similar) in which G filters of the solid-state image capturing element 22a illustrated in FIG. 3 are stacked, and a pixel row of g pixels adjacent thereto, one pixel of four pixels is set as the pair of a phase difference pixel 2. In the phase difference pixel (the pair of the G pixel and the g pixel) 2, a light blocking film opening 2a is installed to be smaller than a light blocking film opening 3 (only one portion is illustrated) of another general pixel and also to be eccentric to a right side with respect to a pixel center of a G pixel 2 and a light blocking opening 2b is installed to be the same as the light blocking film opening 2a and also to be eccentric to a left side with respect to a pixel center of a g pixel 2 to achieve the pupil division.

Further, in an example of FIG. 3, the pixel array is the so-called honeycomb pixel array, but the embodiment below may be applied even in the image capturing element in which the pixel array is the square lattice array. Since a pair of phase difference pixels are preferably pixels having the same color, the color filter array in which two pixels having the same color are arrayed may be used.

Figure 4:
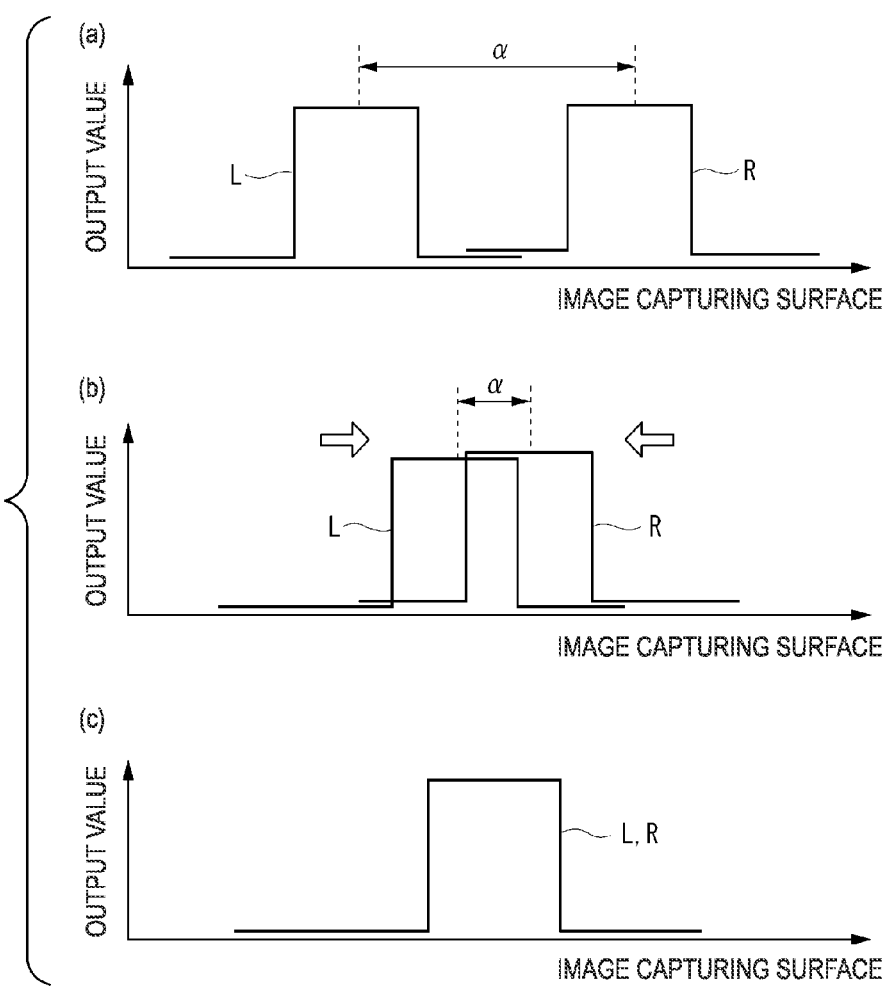
FIG. 4 is an explanatory diagram of a phase difference by a phase difference pixel.

FIG. 4 is an explanatory diagram of phase difference detection by a pair of phase difference pixels (one pixel and the other pixel will be referred to as a first pixel and a second pixel, respectively). (a) of FIG. 4 is a graph illustrating a relationship between an output distribution L of the first pixel and an output distribution R of the second pixel and a coordinate position of an image capturing surface when a photographic subject exists at a position which significantly deviates from a focusing position. The respective output distributions L and R have a mountain shape (illustrated as a rectangular wave in FIG. 4) and an interval a therebetween is opened.

(b) of FIG. 4 is a graph illustrating the output distributions L and R of the first pixel and the second pixel when the photographic subject exists closer to the focusing position than (a) of FIG. 4. As compared with (a) of FIG. 4, the output distributions L and R are close to each other. That is, the interval a between the respective output distributions L and R is smaller than that of (a) of FIG. 4.

(c) of FIG. 4 is a graph illustrating the output distributions L and R of the first pixel and the second pixel when the photographic subject exists at the focusing position. When the photographic subject exists at the focusing position, a phase difference does not exist between detection signals of the first pixel and the second pixel and both the output distributions L and R overlap each other. The phase difference amount of the detection signals by the first pixel and the second pixel may be acquired based on, for example, a value of the interval α.

Figure 5:
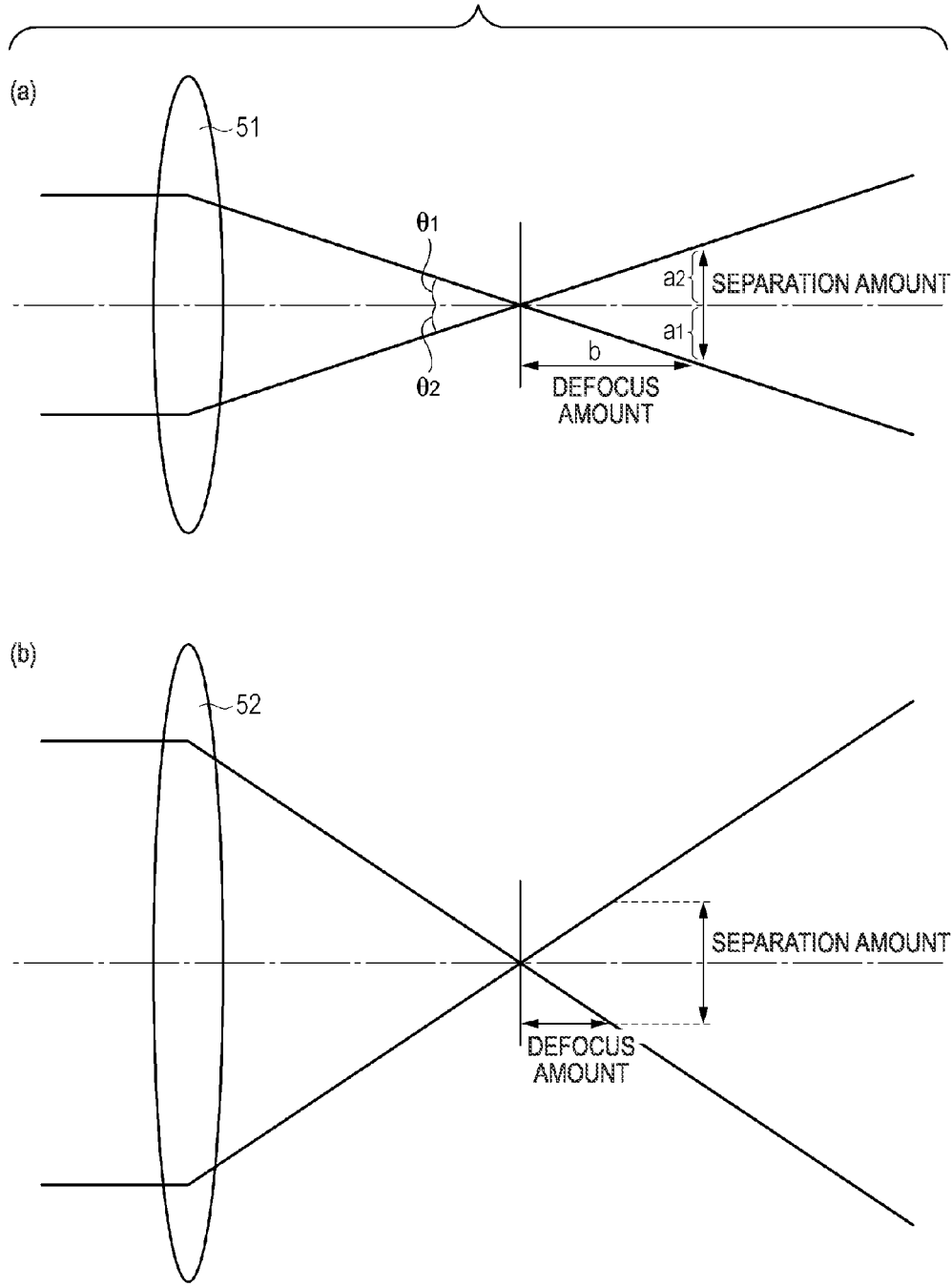
FIG. 5 is a diagram describing the relationship between a phase difference amount (separation amount) and a defocus amount before (a) and after (b) a photographing lens having a different F number is replaced.

FIG. 5 is a diagram illustrating a relationship of a phase difference amount (=separation amount) of the first pixel and the second pixel and a defocus amount. The defocus amount is a distance between an image forming position (separation amount=0) and the image capturing surface when an image is not formed on the image capturing surface, that is, an out-of-focus amount.

Incident angles θ1 and θ2 of incident light, respective separation amounts a1 and a2 (a total separation amount is a1+a2), and a defocus amount b have a predetermined functional relationship, and $\tan\theta 1 = a1/b$, that is, $\theta 1 = \tan^{-1} a1/b$, and $\tan\theta 2 = a2/b$, that is, $\theta 2 = \tan^{-1} a2/b$.

As a result, when the phase difference amounts (separation amount=a1+a2) of the first pixel and the second pixel, and θ1 and θ2 may be known, the defocus amount b may be acquired. Therefore, in the embodiment, it is assumed that parameters θ1 and θ2 regarding a ratio between the defocus amount and the separation amount (phase difference amount) are focusing parameters and values of the parameters are calculated. Of course, "tan θ" may be set as the parameter.

Herein, a problem is that when a photographing lens 51 illustrated in (a) of FIG. 5 is replaced with a photographing lens 52 having a different F number as illustrated in (b) of FIG. 5, since the incident angle of the incident light is changed, the defocus amount is changed by the photographing lens.

Therefore, in the embodiment, although the F number of the photographing lens is different, a focusing parameter value capable of precisely acquiring the defocus amount is calculated, by the following manner.

Figure 6:
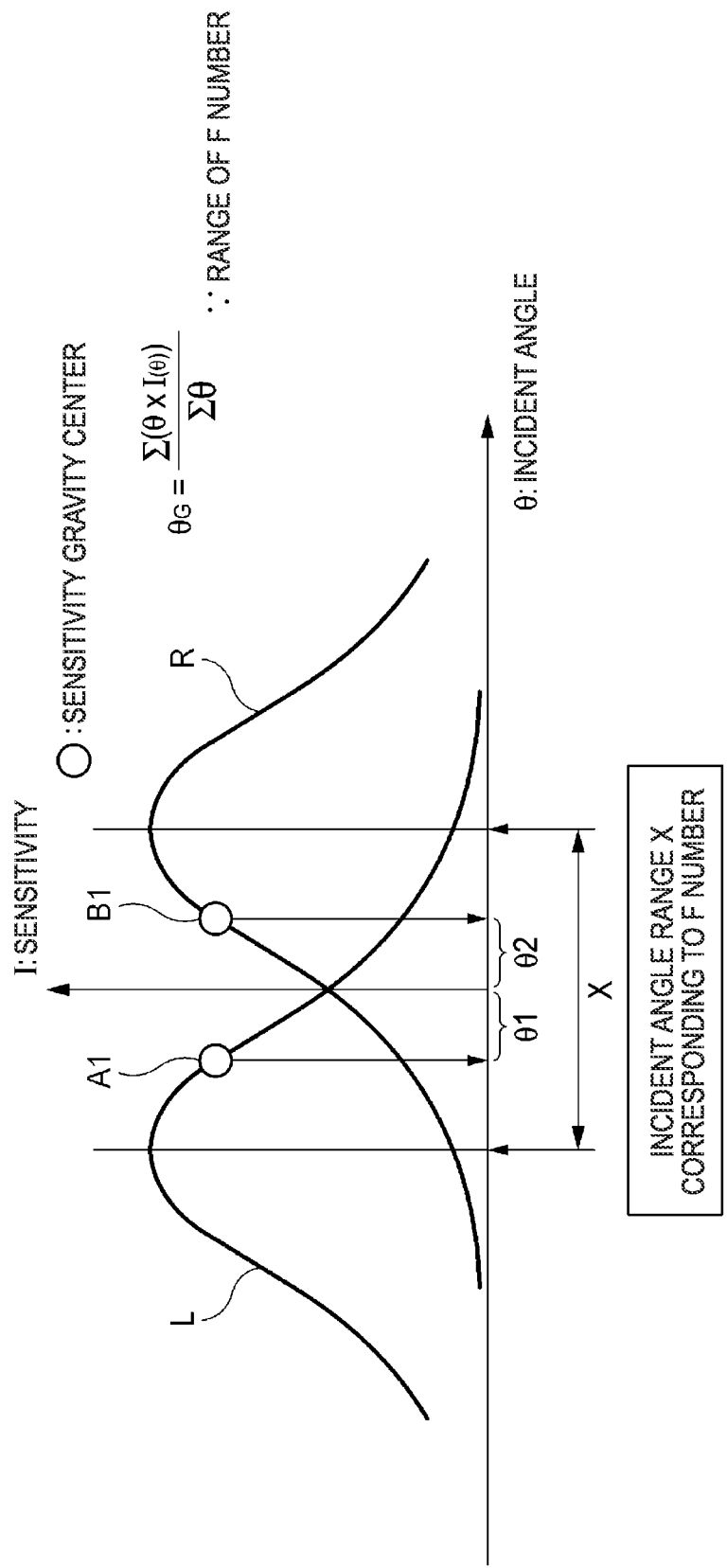
FIG. 6 is an explanatory diagram of a method for calculating a focusing parameter value according to a first embodiment of the present invention.

FIG. 6 is an explanatory diagram of a method for calculating a focusing parameter value according to a first embodiment of the present invention. L and R show a light receiving sensitivity distribution characteristic L which is sensitivity for each incident angle of the incident light of the first pixel and similarly, a light receiving sensitivity distribution characteristic R which is sensitivity for each incident angle of the incident light of the second pixel. A horizontal axis in FIG. 4 is a coordinate position of the image capturing surface, but a horizontal axis in FIG. 6 is the incident angle of the incident light. In the embodiment, the focusing parameter value is calculated in the light receiving sensitivity distribution characteristics L and R, but the light receiving sensitivity distribution characteristics L and R in a partial region only within an incident angle range (within a range X) corresponding to the F number of the photographing lens are used. Data representing the relationship between the light receiving sensitivity distribution characteristics L and R, and the incident angle in FIG. 6 is preferably acquired in advance at the time of examining the image capturing element after manufacturing the image capturing element.

In an incident angle range X corresponding to the F number of the photographing lens in photographing, a sensitivity gravity center (luminance gravity center) position $A_1$ of the light receiving sensitivity distribution characteristic L is acquired and a sensitivity gravity center position $B_1$ of the light receiving sensitivity distribution characteristic R is calculated based on Equation 1 below.

$$\theta_G = \frac{\sum(\theta \times I_{(\theta)})}{\sum \theta} \quad \because \text{range of } F \text{ number} \quad \text{[Equation 1]}$$

Within the incident angle range X corresponding to the F number, a multiplication value of the an incident angle θ and light receiving sensitivity I(θ) is integrated as a value of θ and the integration value is divided by an integration value of θ to obtain a sensitivity gravity center θG. An incident angle corresponding to the sensitivity gravity center position A1 becomes θ1 which is the focusing parameter value and an incident angle corresponding to the sensitivity gravity center position B1 becomes θ2 which is the focusing parameter value.

When the F number of the lens is decided, that is, when a used photographing lens is decided and the range X of FIG. 6 is decided, the parameter values θ1 and θ2 which are acquired as described above become unchanged values, and as a result, when the photographing lens is focusing-controlled by obtaining the defocus amount from the parameter value and the phase difference amount obtained by the difference in output between the first pixel and the second pixel similarly as in the related art, the photographic subject may be focused with high precision regardless of the type of photographing lens mounted on the image capturing apparatus.

According to the embodiment described above, since the focusing parameter value is obtained within the range X corresponding to the F number, the focusing control of the lens may be performed with precision irrespective of the type of photographing lens.

Further, although an optical characteristic of the photographing lens varies and the range X corresponding to the F number varies by the photographing lens, since the calculation is performed within the range X, a parameter value which is not influenced by the variation of the optical characteristic of the photographing lens may be obtained.

Further, although entity fluctuation exists in a structure of the phase difference pixel of the image capturing element, the calculation is performed based on the light receiving sensitivity curves L and R of the phase difference pixel for each entity of the image capturing element to calculate a parameter value which is not influenced by the entity fluctuation of the image capturing element.

Figure 7:
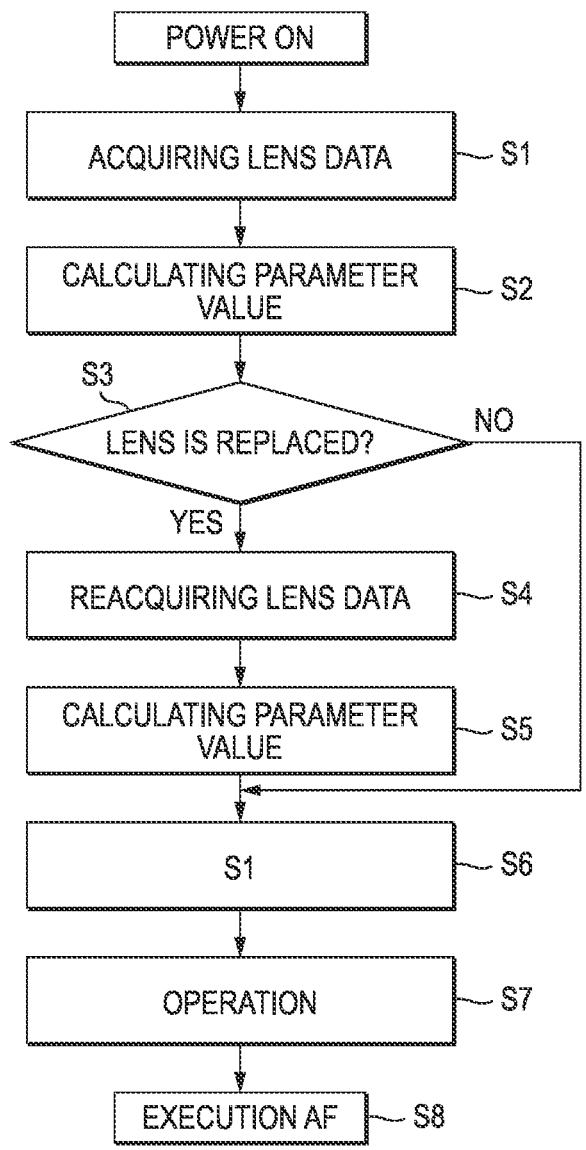
FIG. 7 is a flowchart illustrating a calculating sequence of a parameter value when a lens is replaced.

FIG. 7 is a flowchart illustrating an imaging sequence in which the CPU 29 of the image capturing apparatus illustrated in FIG. 1 executes through the driving unit 24 or the digital signal processing unit 26 thereunder. When a power of the camera is turned ON, the CPU 29 acquires lens data (step S1). That is, data of the F number set in the photographing lens (diaphragm of the photographing optical system) is acquired.

In subsequent step S2, a captured image signal which is output from the solid-state image capturing element 22a in a moving picture state and processed by the digital signal processing unit 26 is analyzed and the focusing parameter values θ1 and θ2 are calculated by the equation described in FIG. 6.

In subsequent step S3, it is determined whether the lens replacement is performed (alternatively, whether the F number is changed by adjusting the diaphragm 21b of the photographing optical system) and when the lens replacement (alternatively, the change of the F number) is not performed, the process skips middle steps to step S6 and waits for S1 pressing (half-pressing) which is a 2-stage shutter button. In addition, when the shutter button is half-pressed, the defocus amount is obtained by the calculation based on the focusing parameter values θ1 and θ2 and the phase difference amount obtained by the known method in the related art (step S7) and a focusing operation is executed in step S8 (step S8). Hereinafter, known photographing processing is performed while waiting for S2 pressing (full pressing) of the 2-stage shutter button and a description thereof will be omitted.

In step S3, when it is determined that the lens replacement (alternatively, the change of the F number) is performed, the process proceeds to step S4 to acquire data of the F number set in the photographing lens after the lens replacement (alternatively, the change of the F number). In addition, in subsequent step S5, the focusing parameter values θ1 and θ2 are calculated by the equation described in FIG. 6 and hereinafter, the process proceeds to step S6 described above.

According to the embodiment described above, although the lens replacement is performed, an appropriate focusing parameter value is calculated abd thus, an image in which the photographic subject is focused may be captured. Further, as the focusing parameter value calculated in the embodiment, is preferably calculated an average value of the parameter values which may be obtained from each of the plurality of pairs of phase difference pixels discretely formed within the focus detection region 42 (the center is the center of the image capturing element light receiving region 41) illustrated in FIG. 2.

Further, information regarding the photographing lens, that is, the F number or the incident angle range for each height may be acquired even in any pattern of patterns such as cases below;

(1) a case in which the information is acquired from the lens, (2) a case in which the information is obtained from setting information at a body of the image capturing apparatus, and (3) a case in which a lens ID representing a lens type is acquired from the lens and lens information (the F number or the incident angle range for each height) for each lens ID stored in advance by the image capturing apparatus body.

Figure 8:
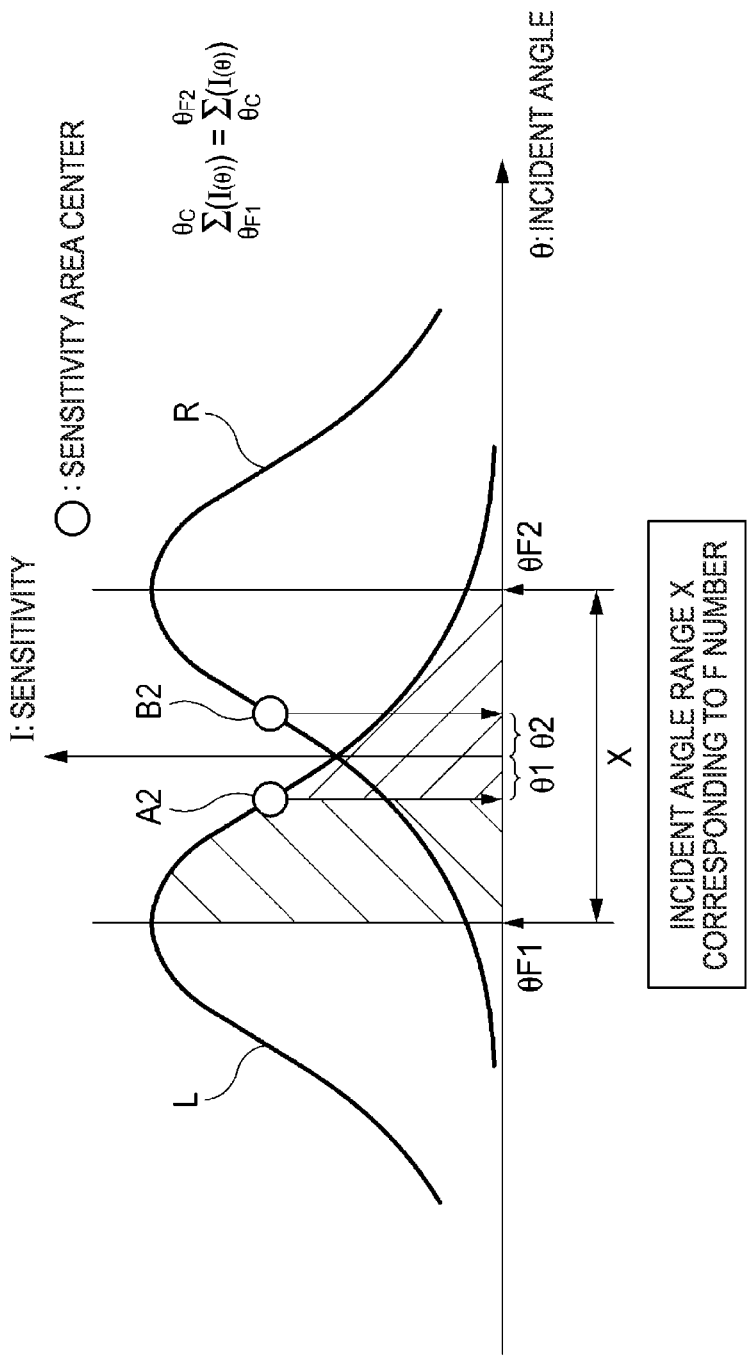
FIG. 8 is an explanatory diagram of a method for calculating a focusing parameter value according to a second embodiment of the present invention.

FIG. 8 is an explanatory diagram of calculating a focusing parameter value according to another embodiment of the present invention. Although the focusing parameter value is calculated by obtaining the sensitivity gravity center positions A1 and B1 in the embodiment of FIG. 6, in the embodiment, a sensitivity area center position A2 of the sensitivity distribution L in a partial region within the range X and a sensitivity area center position B2 of the sensitivity distribution R in the partial region within the range X are obtained to calculate the focusing parameter value from the angles θ1 and θ2 by using Equation 2 below.

$$\sum_{\theta_{F1}}^{\theta_C} (I_{(\theta)}) = \sum_{\theta_C}^{\theta_{F2}} (I_{(\theta)})$$ [Equation 2]

According to the calculation equation, when the incident angle range X corresponding to the F number is set as θF1 to θF2 and an angle at which the sensitivity area center position is A2 in the sensitivity distribution characteristic L is set as θc, the position of θc when an integration value from θF1 to θc at the sensitivity I(0) is equal to an integration value from θc to θF2 at the sensitivity I(θ) is set as the sensitivity area center position. In the sensitivity distribution R, the calculation is performed in the same manner as above.

When illustrated with reference to FIG. 8, within the range X of the sensitivity distribution characteristic L, the sensitivity area center position A2 in which a right hatching region has the same area as a left hatching region becomes a sensitivity area center. Although the focusing parameter values θ1 and θ2 are calculated from not the sensitivity gravity center positions A1 and B1 but the sensitivity area center positions A2 and B2, the higher-precision focusing control may be achieved than the related art that performs the focusing control without considering the lens F number.

Figure 9:
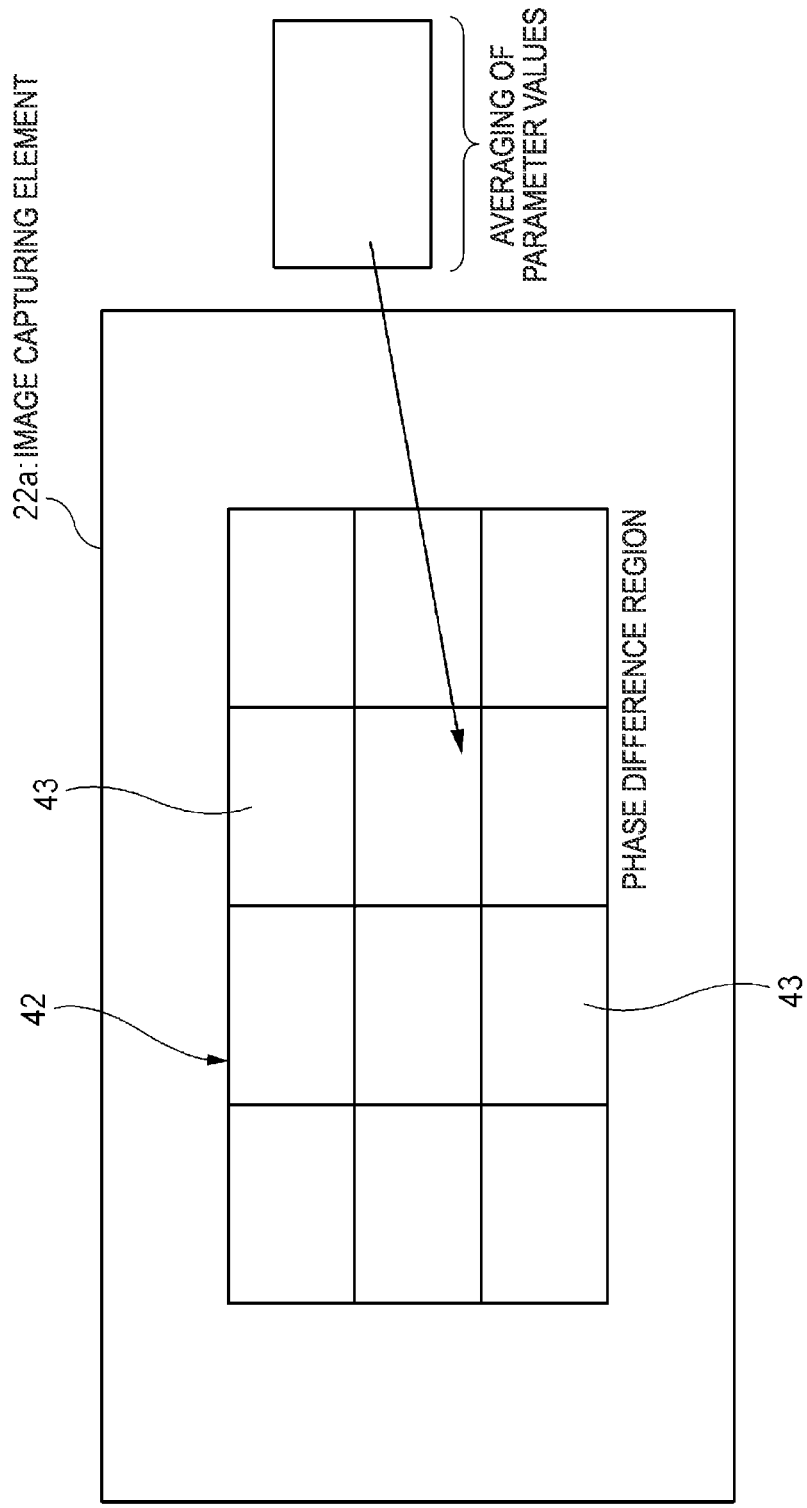
FIG. 9 is an explanatory diagram of dividing a focus detection region into a plurality of regions.

FIG. 9 is an explanatory diagram of another embodiment of the focus detection region (phase difference region) 42 provided in the solid-state image capturing element 22a. In the aforementioned embodiment, the focusing parameter value is calculated in one focus detection region 42, but in the embodiment, the focus detection region 42 is divided into a plurality of regions, 4×3=12 division regions 43 in the illustrated example to calculate an average value of the focusing parameter value for each of the division regions 43 and the average value is set as the parameter value for each division region 43.

An image of a primary photographic subject which is formed on a light receiving surface of the solid-state image capturing element 22a is not particularly formed at the center of the solid-state image capturing element 22a and the image exists at a predetermined coordinate position such as a high position, a low position, a position inclined to the right side, a position inclined to the left side, or the like from the light receiving surface depending on a photographed scene. As a result, calculating the focusing parameter value for each division region 43 by dividing the focus detection region 42 into the plurality of division regions 43 increases precision.

Figure 10:
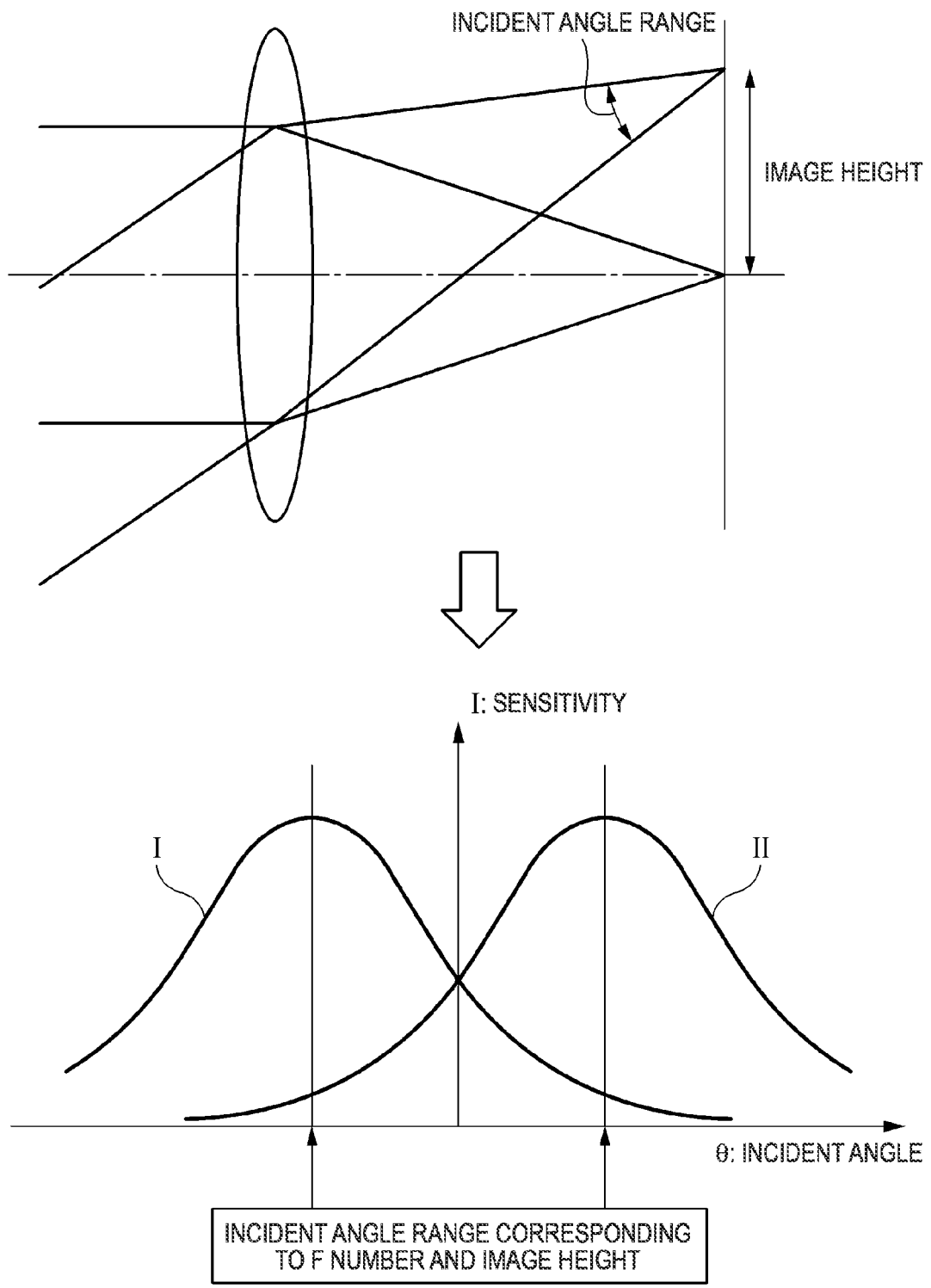
FIG. 10 is a diagram illustrating the relationship between a position of the division region relative to the center of a light receiving surface and an incident angle.

Further, for example, a case in which the image height of the primary photographic subject is large is illustrated in FIG. 10, but in this case, the range of the incident angle, that is, the range of the incident angle corresponding to the F number varies depending on the image height (the range of the incident angle decreases in a division region in which an incident position is raised, a division region in which the incident position is lowered, and a division region in which the incident position is horizontally distant, with respect to the incident angle range when the image height is 0), and as a result, calculating the focusing parameter value for each division region 43 enables high-precision calculation.

Figure 11:
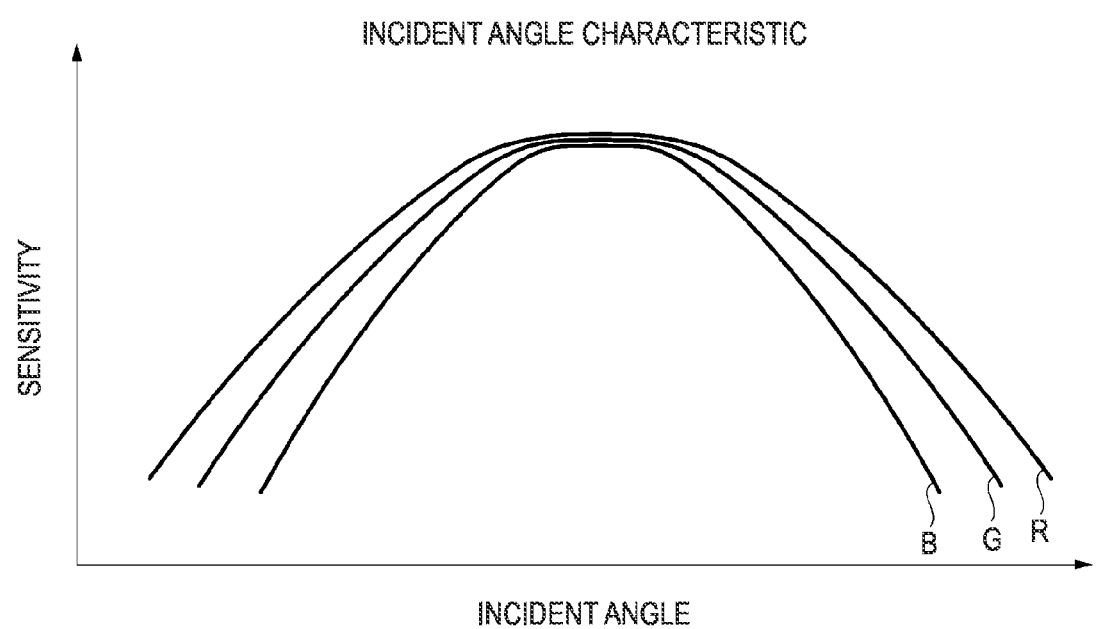
FIG. 11 is a graph illustrating that an incident angle characteristic is changed by a color difference R, G, and B of incident light.

In the case of the solid-state image capturing element 22a illustrated in FIG. 3, the pair pixels of the G pixel and the g pixel are set as the phase difference pixel pair, but a pair of the R pixel and the r pixel and a pair of the B pixel and the b pixel may be set as the phase difference pixel. In this case, since wavelengths of R light, G light, and B light are different from each other, it should be considered that the incident angle characteristic is changed. The incident angle characteristics of the R light, the G light, and the B light in the general pixel are illustrated in FIG. 11, but similarly even in the phase difference pixel, the incident angle depends on the wavelength. The incident angle range X corresponding to the same F number is not changed in R, G, and B, but the integration value within the range is changed in the R, G, and B, and as a result, a sensitivity ratio is changed. By considering this, the focusing parameter value needs to be calculated.

Figure 12:
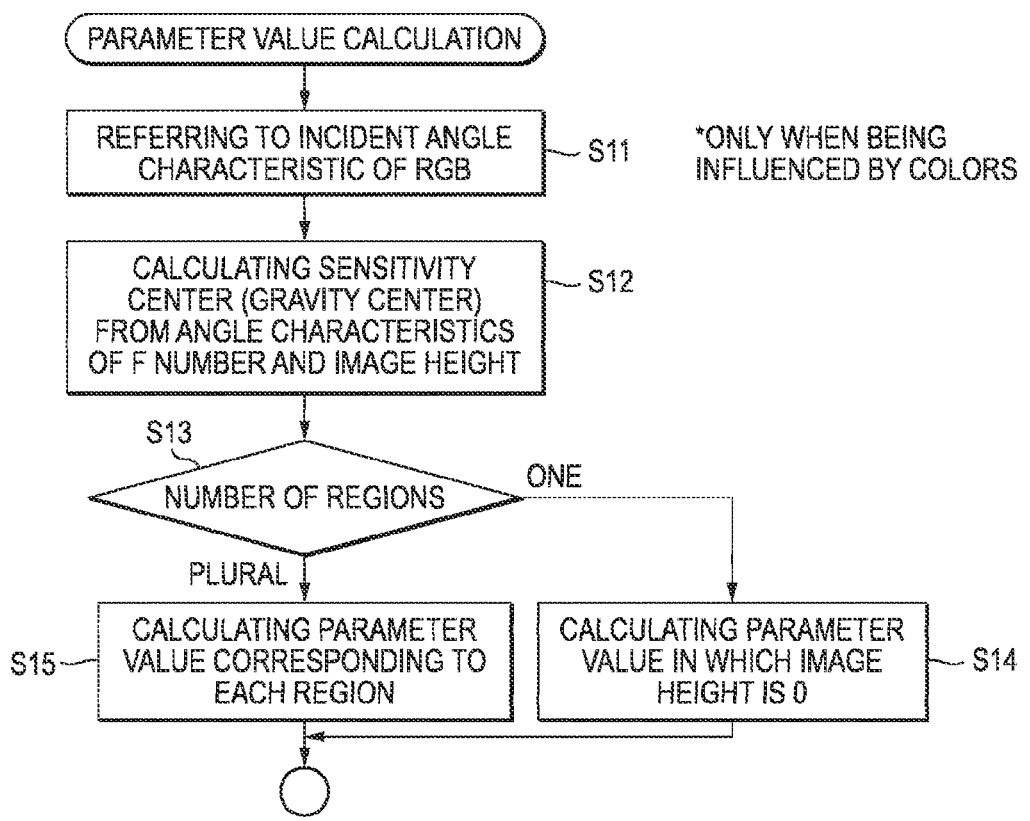
FIG. 12 is a flowchart illustrating a detailed processing sequence of a parameter value calculating step of FIG. 7.

FIG. 12 is a flowchart illustrating a detailed processing sequence of step S2 or step S5 of FIG. 7. When a processing step of calculating the focusing parameter value is performed, first, an incident angle characteristic of RGB is referred to in step S11 (when the phase difference pixel is provided even in the R pixel and the B pixel). In addition, in subsequent step S12, a sensitivity center is calculated from the angle characteristics of the F number and the image height. The sensitivity center may be the sensitivity gravity center position of FIG. 5 or the sensitivity area center of FIG. 8.

In step S13 subsequent to step S12, it is determined whether the number of phase difference regions is one or plural and when the number of phase difference regions is only one, the process proceeds to step S14 to calculate the focusing parameter value in which the image height is 0 and ends the processing. When the number of phase difference regions is plural, the process proceeds to step S15 to calculate the focusing parameter value corresponding to each region and ends the processing.

According to the aforementioned embodiment, since the focusing parameter value is calculated from the distribution characteristic of the light receiving sensitivity which is the sensitivity for each of the incident angle of the incident light corresponding to the F number of the photographing lens and the incident angle of incident light of for each phase difference pixel pair, the appropriate focusing parameter value may be calculated even when the photographing lens is replaced and the photographic subject of the photographing lens is enabled to be focused with high precision.

Further, the embodiment in which the focusing parameter values θ1 and θ2 are obtained from the sensitivity gravity center position and the embodiment in which the focusing parameter values θ1 and θ2 are obtained from the sensitivity area center position have been described above, but the present invention is not limited to the embodiments. In the present invention, both the light receiving sensitivity distributions L and R are not used, but only partial regions within the range of the incident angle corresponding to the F number between the light receiving sensitivity distributions L and R to obtain the sensitivity center and the focusing parameter value is calculated based thereon.

Further, the light receiving sensitivity distribution of each embodiment may be a sensitivity ratio of sensitivity for each incident angle of incident light to two phase difference pixels that make a pair and sensitivity for each incident angle of incident light to pixels other than the phase difference pixel, in addition to the sensitivity of the phase difference pixel.

Figure 13:
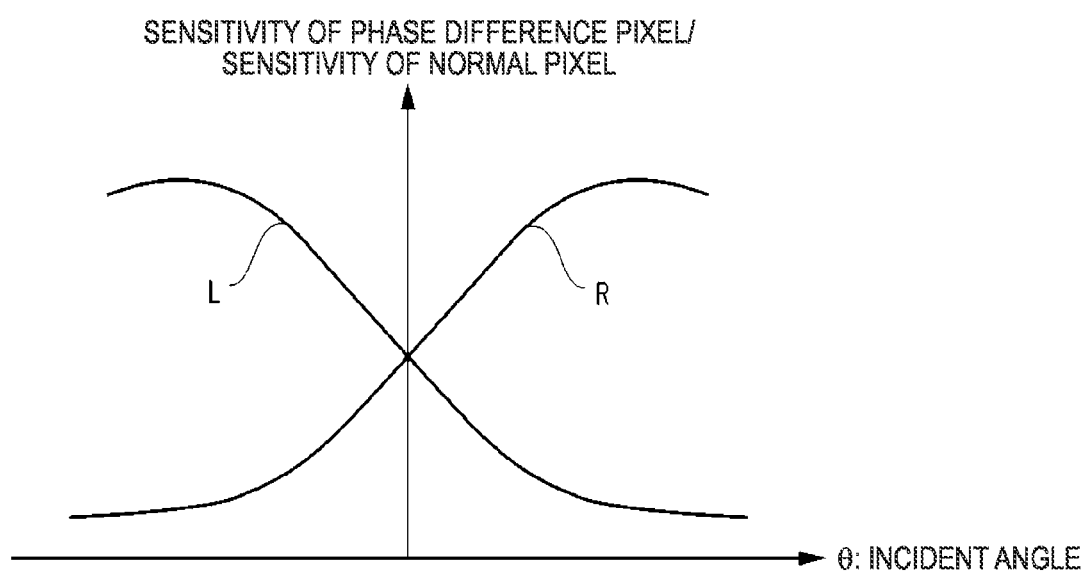
FIG. 13 is a diagram illustrating an incident angle characteristic of a ratio of sensitivity of a phase difference pixel/sensitivity of a general pixel.

That is, as the light receiving sensitivity distribution used when the relationship between the defocus amount and the separation amount is calculated, a ratio represented by the sensitivity of the phase difference pixel/the sensitivity of the general pixel is used instead of using the sensitivity of the phase difference pixel. FIG. 13 is a diagram illustrating an incident angle characteristic of a ratio of sensitivity of a phase difference pixel/sensitivity of a general pixel. The ratio of the sensitivity of the phase difference pixel/sensitivity of the general pixel may be obtained from an output value of the phase difference pixel/an output value of the general pixel under the same condition. A combination of the phase difference pixel and the general pixel for obtaining the sensitivity ratio is preferably a combination of neighboring pixels.

By using the ratio of the sensitivity of the phase difference pixel/sensitivity of the general pixel, the light receiving sensitivity distribution does not depend on an absolute value of a light amount at the time of acquiring the light receiving sensitivity distribution. As a result, the light receiving sensitivity distribution may be acquired comparatively easily and precisely. The focusing parameter value in this case may be obtained by calculating the sensitivity gravity center or the sensitivity area center from the light receiving sensitivity distribution illustrated in FIG. 13 similarly as described above, and the relationship between the defocus amount and the separation amount may be precisely calculated.

As described above, the present description discloses the following matters.

An image capturing apparatus and a method for calculating a focusing parameter value of the embodiments is characterized by comprising: an image capturing element in which a plurality of pixels is formed and arranged in a two-dimensional array pattern and phase difference pixels are formed in a focus detection region within an effective pixel region; a photographing lens installed in a stage preceding the image capturing element; a phase difference amount detecting unit analyzing a captured image signal by the image capturing element and obtaining a phase difference amount from detection signals of two of the phase difference pixels that make a pair; and a control unit obtaining a defocus amount of a photographic subject image picked up by the image capturing element through the photographing lens from the phase difference amount detected by the phase difference amount detecting unit and performing a focusing control of the photographing lens, in which the control unit obtains a parameter value regarding a ratio of the defocus amount and the phase difference amount based on photographing lens information of the photographing lens and a light receiving sensitivity distribution which indicates sensitivity for each incident angle of incident light for the two of the phase difference pixels that make the pair, and obtains the defocus amount from the parameter value and the detected phase difference amount.

And, the image capturing apparatus of the embodiments is characterized in that the photographing lens information includes an F number of the photographing lens, and the control unit calculates a value of an incident angle corresponding to a sensitivity center of a partial region as the parameter value in the partial region within a range of an incident angle corresponding to the F number of the photographing lens in the light receiving sensitivity distribution.

And, the image capturing apparatus of the embodiments is characterized in that the value of the incident angle corresponding to the sensitivity center is a value of an incident angle corresponding to a sensitivity gravity center position of the partial region in the partial region within the range of the incident angle corresponding to the F number of the photographing lens in the light receiving sensitivity distribution.

And, the image capturing apparatus of the embodiments is characterized in that the value of the incident angle corresponding to the sensitivity center is a value of an incident angle corresponding to a sensitivity area center position of the partial region in the partial region within the range of the incident angle corresponding to the F number of the photographing lens in the light receiving sensitivity distribution.

And, the image capturing apparatus of the embodiments is characterized in that the photographing lens information includes the F number of the photographing lens and information on an incident angle range corresponding to an image height position at least within the focus detection region on an image capturing surface of the image capturing element, and the control unit calculates the parameter value by using the range of the incident angle corresponding to the image height within the focus detection region and the range of the incident angle corresponding to the F number.

And, the image capturing apparatus of the embodiments is characterized in that the control unit divides the focus detection region into a plurality of division regions to obtain the parameter value for each division region corresponding to the image height.

And, the image capturing apparatus of the embodiments is characterized in that the light receiving sensitivity distribution is configured by a sensitivity ratio of sensitivity for each incident angle of the incident light for the two of the phase difference pixels that make the pair and sensitivity for each incident angle of the incident light for pixels other than the phase difference pixels.

And, the image capturing apparatus of the embodiments is characterized in that the control unit obtains the parameter value for each color light from the light receiving sensitivity distribution for each of red light, green light, and blue light.

And, the image capturing apparatus of the embodiments is characterized in that the photographing lens is a replaceable photographing lens and the parameter value is obtained after replacing the photographing lens.

According to the embodiments, even when the F number of the photographing lens is changed, the defocus amount may be precisely obtained to focusing-control the photographing lens with high precision.

INDUSTRIAL APPLICABILITY

The image capturing apparatus and the method for calculating the focusing parameter value according to the present invention are usefully applied to the digital camera because the focusing operation on the photographic subject of the photographing lens can be accurately performed even when the lens is replaced and a photographic subject image which is focused can be picked up.

Although the present invention has been described in detail with reference to a specific embodiment, it is apparent to those skilled in the art that various changes or modifications can be made without departing from the spirit and the scope of the present invention.

This application is based on Japanese Patent Application No. 2011-218532, filed on Sep. 30, 2011 and Japanese Patent Application No. 2012-189504, filed on Aug. 30, 2012, the entire contents of which are incorporated herein by reference.

REFERENCE SIGNS LIST

2: Phase difference detection pixel pair (first pixel and second pixel)
2a, 2b: Light blocking layer opening which is eccentric
10: Image capturing apparatus (digital camera)
21: Photographing optical system
21a: Photographing lens
21b: Diaphragm
22a: Solid-state image capturing element
24: Driving unit
26: Digital signal processing unit
29: System control unit (CPU)
41: Light receiving region
42: Focus detection region
43: Division region
L: Light receiving sensitivity distribution characteristic of first pixel
R: Light receiving sensitivity distribution characteristic of second pixel
A1, B1: Sensitivity gravity center position
A2, B2: Sensitivity area center position

What is claimed is:

1. An image capturing apparatus, comprising:
an image capturing element in which a plurality of pixels is formed and arranged in a two-dimensional array pattern and phase difference pixels are formed in a focus detection region within an effective pixel region;
a photographing lens installed in a stage preceding the image capturing element;
a phase difference amount detecting unit analyzing a captured image signal by the image capturing element and obtaining a phase difference amount from detection signals of two of the phase difference pixels that make a pair; and
a control unit obtaining a defocus amount of a photographic subject image picked up by the image capturing element through the photographing lens from the phase difference amount detected by the phase difference amount detecting unit and performing a focusing control of the photographing lens,
wherein the control unit obtains a parameter value regarding a ratio of the defocus amount and the phase difference amount based on photographing lens information of the photographing lens and a light receiving sensitivity distribution which indicates sensitivity for each incident angle of incident light for the two of the phase difference pixels that make the pair, and obtains the defocus amount from the parameter value and the detected phase difference amount.

2. The image capturing apparatus of claim 1, wherein the photographing lens information includes an F number of the photographing lens, and
the control unit calculates a value of an incident angle corresponding to a sensitivity center of a partial region as the parameter value in the partial region within a range of an incident angle corresponding to the F number of the photographing lens in the light receiving sensitivity distribution.

3. The image capturing apparatus of claim 2, wherein the value of the incident angle corresponding to the sensitivity center is a value of an incident angle corresponding to a sensitivity gravity center position of the partial region in the partial region within the range of the incident angle corresponding to the F number of the photographing lens in the light receiving sensitivity distribution.

4. The image capturing apparatus of claim 2, wherein the value of the incident angle corresponding to the sensitivity center is a value of an incident angle corresponding to a sensitivity area center position of the partial region in the partial region within the range of the incident angle corresponding to the F number of the photographing lens in the light receiving sensitivity distribution.

5. The image capturing apparatus of claim 1, wherein the photographing lens information includes the F number of the photographing lens and information on an incident angle range corresponding to an image height position at least within the focus detection region on an image capturing surface of the image capturing element, and the control unit calculates the parameter value by using the range of the incident angle corresponding to the image height within the focus detection region and the range of the incident angle corresponding to the F number.

6. The image capturing apparatus of claim 5, wherein the control unit divides the focus detection region into a plurality of division regions to obtain the parameter value for each division region corresponding to the image height.

7. The image capturing apparatus of claim 1, wherein the light receiving sensitivity distribution is configured by a sensitivity ratio of sensitivity for each incident angle of the incident light for the two of the phase difference pixels that make the pair and sensitivity for each incident angle of the incident light for pixels other than the phase difference pixels.

8. The image capturing apparatus of claim 1, wherein the control unit obtains the parameter value for each color light from the light receiving sensitivity distribution for each of red light, green light, and blue light.

9. The image capturing apparatus of claim 1, wherein the photographing lens is a replaceable photographing lens and the parameter value is obtained after replacing the photographing lens.

10. A method for calculating a focusing parameter value of an image capturing apparatus which includes:
an image capturing element in which a plurality of pixels is formed and arranged in a two-dimensional array pattern and phase difference pixels are formed in a focus detection region within an effective pixel region;
a photographing lens installed in a stage preceding the image capturing element;
a phase difference amount detecting unit analyzing a captured image signal by the image capturing element and obtaining a phase difference amount from detection signals of two of the phase difference pixels that make a pair; and
a control unit obtaining a defocus amount of a photographic subject image picked up by the image capturing element through the photographing lens from the phase difference amount detected by the phase difference amount detecting unit and performing a focusing control of the photographing lens, the method comprising:
obtaining a parameter value regarding a ratio of the defocus amount and the phase difference amount based on photographing lens information of the photographing lens and a light receiving sensitivity distribution which indicates sensitivity for each incident angle of incident light for the two of the phase difference pixels that make the pair; and obtaining the defocus amount from the parameter value and the detected phase difference amount.

* * * * *